A. DOW.
STUMP PULLER.
APPLICATION FILED FEB. 24, 1921.
1,384,384.
Patented July 12, 1921.
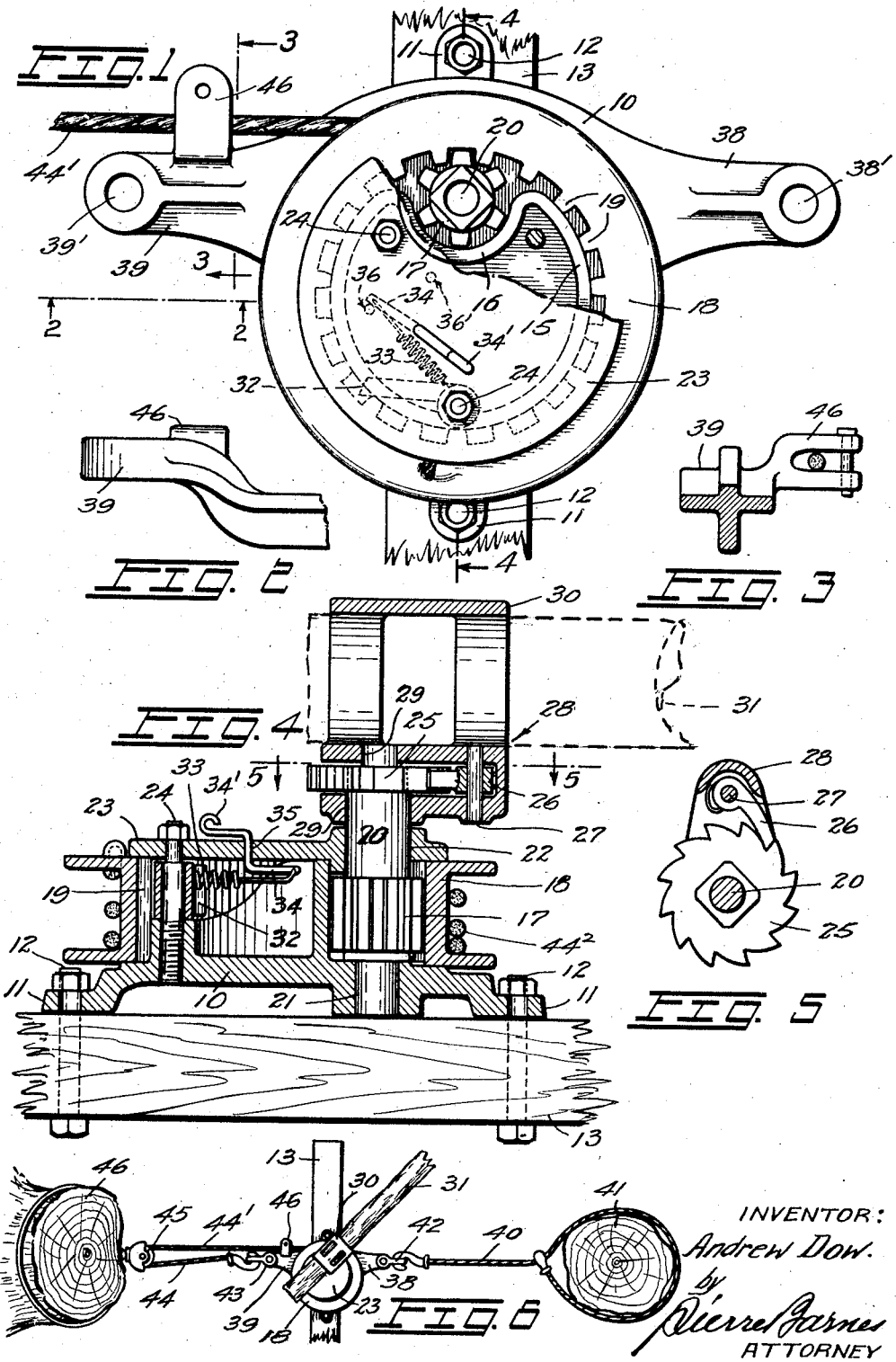
INVENTOR:
Andrew Dow.
by
Pierre Barnes
ATTORNEY

UNITED STATES PATENT OFFICE.

ANDREW DOW, OF SEATTLE, WASHINGTON.

STUMP-PULLER.

1,384,384.  Specification of Letters Patent.  Patented July 12, 1921.

Application filed February 24, 1921. Serial No. 447,482.

*To all whom it may concern:*

Be it known that I, ANDREW DOW, a citizen of the United States, residing at Seattle, in the county of King and State of Washington, have invented certain new and useful Improvements in Stump-Pullers, of which the following is a specification.

This invention relates to portable windlasses and is designed, more especially for use as a stump puller.

The object of my invention is the provision of an inexpensively constructed, durable, powerful and efficient machine of this character.

The invention consists in the novel construction, adaptation and combination of parts as hereinafter described and claimed.

In the accompanying drawings,—

Figure 1 is a plan view, shown partly broken away, of a machine embodying the present invention. Fig. 2 is a detail elevational view of the cable attaching arm at the left hand side of Fig. 1 as viewed from line 2—2 of the same. Figs. 3 and 4 are sectional views through 3—3 and 4—4 of Fig. 1. Fig. 5 is a sectional view through 5—5 of Fig. 4. Fig. 6 is a plan view of the machine shown applied.

In carrying out my invention, I provide a frame comprising a base plate 10 provided with apertured lugs 11 for bolts 12 whereby the frame is secured to a supporting beam 13. Extending upwardly from said base plate and integral therewith is a flange of substantially the shape in which it is shown in Fig. 1—that is to say, with a portion 15 which is an arc of a circle arranged concentric to the center of the base plate.

Another portion 16 of said flange extends inwardly to accommodate a spur pinion 17.

Rotatable mounted upon the outer periphery of the flange part 15 is a cable winding drum 18 having in its inner periphery a series of spur teeth 19 which engage the aforesaid spur pinion. Said pinion is formed integral with or rigidly connected to an arbor 20 which is journaled in bearings 21 and 22 respectively provided in the frame base 10 and a cover plate 23 which is removably secured to said base and upon the flange thereof as by means of bolts 24.

Secured to the arbor 20 above said frame is a ratchet wheel 25 which is intermittently actuated through the medium of a spring pressed pawl 26 connected to a pivot pin 27 connected to a head 28 which is journaled at 29 on said arbor above and below said ratchet wheel.

Said head is also provided with an upper portion 30 having a socket for an operating bar or arm 31. Pivotally connected to one of said bolts 24 is a dog 32 which is engageable with the teeth 19 of the drum to prevent accidental retrograde movements of the latter.

Said dog is rendered operable by means of a spring 33 connecting the dog to the arm 34 of a lever which is fulcrumed at 35 in the frame cover plate and is provided above such plate with an arm $34^1$ whereby the arm 34 may be swung from its dotted line position, Fig. 1, against a stud 36 to a position against a second stud $36^1$. By thus moving said lever, the spring 33 is brought from its illustrated position whereat it acts to yieldingly retain the dog 32 in engaged relations with the drum teeth into a position whereat the spring serves to retain the dog away from the drum teeth when it is desired to release the drum for taking up slack in the cable or unwinding the same from the drum.

The base plate 10 of the machine frame is provided with oppositely extending axially alined arm elements 38 and 39 provided with eyes $38^1$ and $39^1$.

Referring to Fig. 6, 40 represents an anchor cable secured about an object such for example, as a stump 41 and engaging a shackle 42 which is secured to the arm 38 by its pin element extending through the respective eye $38^1$.

To the other arm 39 is similarly secured by a shackle 43 the end of a hauling cable 44 which extends about a pulley-sheave 45 attached to a stump 46 being pulled, and said hauling cable extends by a lead $44^1$ thereof through a guide element 46 protruding from the frame arm 39 and is wound as at $44^2$, Fig. 4, in a number of turns about the drum. The tangential positions of the arms 38 and 39 with respect to the drum at its connection with the operating pinion therefor are important features of the present invention, the same being arranged so that the cable strains will be applied in a line extending medially of the engagement between the pinion and the drum. By such devices the drum is subjected to but small strains or stresses, and the drum is rotated with practically no torsional strains and with a minimum of friction upon the bearing therefor.

After the cables are connected to the machine, to the anchor object and to a stump which is to be drawn from the ground, as above explained, the machine is operated by actuating the bar 31 as will be understood.

What I claim, is,—

1. In a machine of the character described, the combination of a drum having internal gear teeth, a frame serving as a journal bearing for said drum and provided with laterally extending arm elements disposed in substantially tangential relations to the pitch circle of said gear teeth, one of said arms serving to connect the frame with an anchor cable, the other of said arms serving to connect the frame to an end of a hauling cable whose other end is wound about said drum, a pinion having an arbor journaled in said frame and engaging the drum teeth, an operating bar, operative connections between said bar and the pinion for transmitting intermittent rotary motion to said drum, and a spring actuated dog for progressively engaging the drum teeth during the rotation of the drum.

2. In a machine of the character described, the combination of a frame comprising a base plate having an upwardly extending flange portion, and a cover plate secured upon the latter, said base plate being provided at its opposite sides with axially alined arms, a cable winding drum rotatably mounted upon said flange and provided with internal gear teeth, a pinion engaging said drum teeth, an arbor for said pinion journaled in said frame base and cover members, a ratchet wheel mounted upon said arbor, a pawl for said wheel, an operating bar, a head therefor journaled upon said arbor and carrying said pawl for imparting intermittent rotary motion to said ratchet wheel whereby the pinion is actuated to drive said drum, a pulley adapted to be connected to a stump, a hauling cable passing about the sheave of said pulley, an end of said cable being connected to one of said arms and the other end of the cable being wound about said drum, and an anchor cable connected to the other of said arms.

Signed at Seattle, Washington, this 15th day of February, 1921.

ANDREW DOW.

Witnesses:
PIERRE BARNES,
MARGARET G. SUPPLE.